US011691229B2

(12) United States Patent
Klinger (10) Patent No.: US 11,691,229 B2
(45) Date of Patent: Jul. 4, 2023

(54) MODULAR PALLET RACK REPAIR KIT (71) Applicant: Daniel V. Klinger, Avon, IN (US)

(72) Inventor: Daniel V. Klinger, Avon, IN (US)

( * ) Notice: Subject to any disclaimer, the term of this patent is extended or adjusted under 35 U.S.C. 154(b) by 233 days.

(21) Appl. No.: 17/213,028

(22) Filed: Mar. 25, 2021

(65) Prior Publication Data
US 2021/0252650 A1  Aug. 19, 2021

Related U.S. Application Data (62) Division of application No. 16/291,982, filed on Mar. 4, 2019, now Pat. No. 10,974,352.

(51) Int. Cl.
| B23P 6/00 | (2006.01) |
| B65G 69/00 | (2006.01) |
| B21D 1/00 | (2006.01) |
| A47B 96/00 | (2006.01) |
| B65G 1/02 | (2006.01) |

(52) U.S. Cl.
CPC ............... *B23P 6/00* (2013.01); *B65G 69/00* (2013.01); *A47B 96/00* (2013.01); *B21D 1/00* (2013.01); *B65G 1/02* (2013.01); *Y10T 29/4973* (2015.01); *Y10T 29/49726* (2015.01); *Y10T 29/49732* (2015.01); *Y10T 29/49734* (2015.01); *Y10T 403/7043* (2015.01)

(58) Field of Classification Search
CPC .. B65G 1/02; B65G 69/00; B23P 6/00; B21D 1/00; A47B 96/00; Y10T 403/7043; Y10T 29/49726; Y10T 29/4973; Y10T 29/49732; Y10T 29/49734
See application file for complete search history.

(56) References Cited

U.S. PATENT DOCUMENTS

| 3,152,670 A | 10/1964 | Selkregg, Jr. et al. |
| 3,695,456 A | 10/1972 | Lewis |
| 3,923,157 A * | 12/1975 | Cavenar .................... B07C 5/04 |
| | | 198/360 |
| 4,074,812 A | 2/1978 | Skubic et al. |
| (Continued) | | |

FOREIGN PATENT DOCUMENTS

| DE | 102007050725 A1 * | 4/2009 | ............... B65G 1/00 |
| DE | 102007057535 A1 | 6/2009 | |
| (Continued) | | | |

OTHER PUBLICATIONS

MacRac Brochure available on line at https://www.got-rack.com/rack-repair-kits/ document disclosed was posted as of Mar. 1, 2019.

*Primary Examiner* — Patrick D Hawn
(74) *Attorney, Agent, or Firm* — Vangelis Economou; Economou IP Law (57) ABSTRACT

A modular repair kit for repairing damaged pallet rack frames and a method of installation thereof which incudes modular elements that can be customized by mechanical process such as cutting, drilling and connecting, for example, by bolts, that avoids major modifications, such as welding, at the installation site. The modular repair kit utilizes a standard replacement post assembly that can be cut to fit into nearly any size gap that is created when the damaged portion of the pallet rack frame is removed. The remaining elements of the repair kit can then be customized to accommodate any size of the standard replacement post assembly.

12 Claims, 7 Drawing Sheets

(56) References Cited

U.S. PATENT DOCUMENTS

| | | | | |
|---|---|---|---|---|
| 4,088,229 A * | 5/1978 | Jacoby | ............ | A47B 91/00 211/183 |
| 6,260,719 B1 * | 7/2001 | Azzopardi | ............ | B65G 1/02 211/189 |
| 6,298,537 B1 * | 10/2001 | Dion | ............ | A47B 96/00 29/402.06 |
| 6,332,549 B1 * | 12/2001 | MacDonald | ............ | A47B 47/027 211/183 |
| 6,405,884 B1 * | 6/2002 | Dion | ............ | A47B 47/02 211/183 |
| 6,557,712 B2 * | 5/2003 | Gruber | ............ | A47B 47/027 211/189 |
| 7,753,220 B2 * | 7/2010 | Konstant | ............ | A47B 91/00 52/693 |
| 8,267,262 B2 * | 9/2012 | Thelwell | ............ | A47B 95/043 5/663 |
| 10,807,845 B2 * | 10/2020 | Weber | ............ | B60D 1/665 |
| 10,974,352 B1 * | 4/2021 | Klinger | ............ | A47B 47/0083 |
| 2005/0150853 A1 * | 7/2005 | Kimball | ............ | A47B 91/00 211/187 |
| 2011/0278251 A1 * | 11/2011 | Smith | ............ | B65G 1/02 211/183 |
| 2012/0298600 A1 * | 11/2012 | McCarthy | ............ | B65G 1/02 211/49.1 |
| 2020/0165064 A1 * | 5/2020 | Harrison | ............ | B65G 1/02 |
| 2022/0143764 A1 * | 5/2022 | Turcich | ............ | B65G 1/04 |

FOREIGN PATENT DOCUMENTS

| | | | | |
|---|---|---|---|---|
| DE | 202010015133 U1 * | 3/2011 | ............ | B65G 1/02 |
| DE | 202011051569 U1 * | 2/2012 | ............ | A47B 96/145 |
| EP | 2537627 A1 | 12/2012 | | |
| EP | 2695834 A1 * | 2/2014 | ............ | B65G 1/02 |
| KR | 909236 B1 * | 7/2009 | | |
| KR | 100909236 B1 * | 7/2009 | ............ | B65F 1/023 |
| KR | 200464149 Y1 * | 12/2012 | ............ | A47B 47/00 |
| KR | 101312019 B1 * | 9/2013 | ............ | B65G 1/02 |
| KR | 20140129408 A * | 11/2014 | ............ | B65G 1/02 |
| KR | 101477200 B1 * | 12/2014 | ............ | A47F 5/00 |
| WO | 2009067990 A1 | 6/2009 | | |
| WO | WO-2009067990 A1 * | 6/2009 | ............ | A47B 96/00 |
| WO | WO-2022232932 A1 * | 11/2022 | ............ | A47B 97/00 |

\* cited by examiner

MODULAR PALLET RACK REPAIR KIT

CROSS-REFERENCE TO RELATED APPLICATION

This is a divisional of prior application Ser. No. 16/291,982, filed Mar. 4, 2019, now U.S. Pat. No. 10,974,352, issued on Apr. 13, 2021.

BACKGROUND OF THE INVENTION

1. Field of the Invention

This invention relates generally to warehouse storage pallet racks, and, more specifically, to a modular kit for repairing the front or rear legs of a pallet rack frame structure after structural damage without requiring on-site welding.

2. Background Art

Pallet racks are used for warehousing and to provide shelving on which pallets, upon which goods are stored, are easily accessible for loading and removing pallets by use of fork lifts. Because time and effort concerns, loading pallets onto racks by fork lifts facilitates quick and easy placement on and removal of the palleted goods from the rack. These concerns are especially relevant to the use of fork lift loading in superstores or warehouse type stores, where pallets are loaded directly onto pallet racks for direct purchase by consumers.

Operation of a fork lift may on occasion damage a pallet rack frame due to inadvertent impacts to the pallet rack during loading and unloading, resulting in bent or deformed members, usually in the upright posts. Other deterioration of the pallet frame members may occur as a result of corrosion in the rack frame and posts closest to the floor from flooding naturally from humidity, or from floor cleaning or maintenance when strong chemical cleaning solutions are applied to the floor and inadvertently come into contact with the pallet rack frame.

U.S. Pat. No. 2,765,087, issued to Weinbaum on Oct. 2, 1956, illustrates and describes a system for constructing a knockdown pallet rack which employs mechanically interconnecting standard subassemblies, which require no welding, relying instead on gravity to retain relative positions of the constituent members. Although the system may be readily repaired by substituting new previously assembled standard components, the rack would have to be repaired in place only by unloading the entire contents of the pallet rack. Moreover, the repair would have to be done with standard parts that would require an inventory of a wide variety of standard replacement parts and their transport to the repair site.

U.S. Pat. No. 3,695,456, issued to Lewis on Oct. 3, 1972, describes a pallet rack assembly system with mechanical interconnections between members, as do most pallet racks. The horizontal crossbeams rely on the force of the weight of the bars as acted on by gravity to maintain system integrity. Any teaching of mechanical interconnections as part of a repair kit are not present.

U.S. Pat. No. 4,074,812, issued to Skubic et al. on Feb. 21, 1978, describes post and crossbeam components which are interchangeable within existing pallet racks and could be used in repair of damaged crossbeams. The device operates by gravity acting on the pallet racks to keep the rack's integrity, with a series of spring-loaded latches to keep the crossbeams in place. To exchange a crossbeam or shelf, one would be required to unload an existing rack and at least partially disassemble the rack in order to replace a post or crossbeam.

A pallet rack repair kit is available that is installable without unloading, except in circumstances of excessive loading of the rack, and requires no welding during installation. It is pre-welded as a kit that fits within a specified space, and the exiting pallet rack must be modified to suit the available kit configuration which provides the replacement structure. It consists of a frame with a front upright capable of receiving the lower end of the frame upright, after removal of the damaged lower portion, and then mechanically splicing with the existing structure. Struts extend rearward from the kit upright which struts secure to the rear leg of the pallet rack frame mechanical to transfer the force imparted subsequent impacts from the front leg of the pallet rack to the rear leg of the pallet rack. A similar type of kit is described and illustrated in U.S. Pat. No. 6,332,549, issued to McDonald on Dec. 25, 2001. Both these types of replacement kits require welding of all the parts by the original manufacturer off site from the installment and require the cutting away of the damaged existing pallet posts to precise lengths to enable the replacement kit posts to fit.

None of the known replacement kits, taken either singularly or in combination, provide a modular kit that for replacement of damaged posts of a pallet rack by a replacement kit that is not pre-welded, does not require welding on site, and after cutting and splicing, is mechanically assembled in a simple, secure configuration meeting required specifications to provide a stronger construction than the pallet rack prior to the damage.

SUMMARY OF THE INVENTION

Accordingly, there is provided herein in first embodiment, a repair kit for a pallet rack frame, the pallet rack frame having a plurality of upright posts and a series of perpendicularly extending cross beams and surfaces for receiving pallets, at least one of the upright posts having a damaged section, in which the damaged section of the upright post having been removed so as to provide a location for insertion of the replacement post of the repair kit resulting in an undamaged replacement upright post, the repair kit comprising a replacement post having an upper section, and intermediate section and a lower section, the replacement section being of a discrete length between about one foot and about twenty feet, the replacement post having a front face and a back face, a reinforcement channel member immediately adjoining and being connected to the back face of the replacement post for the entire indeterminate length of the replacement post, a base configured to receive the lower section of the replacement post, the base having a footplate, including at least one anchor to fix the position of the footplate relative to a floor on which the footplate rests, and a post receiving member extending upwardly from the footplate for engaging with and connecting to the lower section of the replacement post, a joint member configured for joining and rigidly connecting the upper section of the replacement post to the remaining undamaged upright at their point of contact, the replacement post being sized to provide a replacement to the removed section of the damaged upright, the replacement post extending vertically from the undamaged upright post end to the base, and wherein the post receiving member fixes the lower section of the replacement post to the floor, the post receiving member further including connecting members for connecting the lower section of the replacement post to the post receiving member, and the joint member connecting the upper section of the replacement post to the undamaged upright post end.

The repair kit of the present invention normally does not use the undamaged back leg of the pallet rack to support or increase the impact capacity of the repair kit. Instead, the modular repair kit according to the present invention includes a single intermediate replacement post having an upper end and a lower end, the replacement post being of indeterminate length. That is, it can be cut to size as the installation requires from a blank that may extend from the lower end to the upper end to a length of from about one foot to about twenty feet.

In a separate second embodiment, the kit reduces the number of parts that are required to maintain in inventory even further when working at a rack frame accident site by having a lower section of a blank replacement post being connected to the footplate by bolts directly, without requiring a joint member for the lower portion of the replacement post to the footplate.

In yet another aspect of the invention is a method of repairing a damaged pallet rack where the damage is contained within a predetermined length of an upright post, the damaged section of the post not exceeding 20 feet, and preferably not exceeding 10 feet. The operative method of repairing a damaged pallet rack frame, the pallet rack frame having a plurality of upright posts and a series of perpendicularly extending cross beams and surfaces for receiving pallets, at least one of the upright posts having a damaged section and an undamaged section, the undamaged section having a lowermost end, comprises the steps of evaluating the damage to the pallet rack frame to determine whether a repair kit may be utilized to repair the damaged upright post, providing a jack having a stabilizing arm and disposing the jack to a position on a surface adjacent the damaged upright post but offset therefrom, attaching the stabilizing arm to a predetermined position of the undamaged pallet rack frame above the damaged portion of the upright post, jacking up the pallet rack frame by use of the jack to a normal frame position wherein the perpendicularly extending cross beams are parallel to the surface on which the pallet rack frame rests and maintaining the jack in position through the following steps of the repair method, selecting a complete length of the damaged section of the upright post to remove, jacking up the pallet rack frame by use of the jack to a normal frame position wherein the perpendicularly extending cross beams are parallel to the ground on which the pallet rack frame rests and maintaining the jack in position through the following steps of the repair method, cutting the damaged section of the post above the damaged section such that following the cutting step, thereby to provide a lowermost end of the undamaged section of the pallet rack frame upright post, the remainder of the upright post above the cut and below the predetermined position where the stabilizing arm is temporarily attached extends upwardly in a vertical direction without any twisting or buckling, removing the damaged section of the upright post and any base adjacent the surface by which the damaged post was supported, attaching a new base to the surface vertically below the undamaged section of the pallet rack frame, the new base comprising a footplate, the footplate including at least one anchor to fix the position of the footplate relative to the surface on which the footplate rests and further comprising a post receiving member, measuring the length of the gap created by cutting the damaged section of the post, measuring and cutting from a length of replacement post a length of a replacement post section to fit within the gap between a lowermost end of the undamaged post and the footplate, inserting the replacement post section into the gap by aligning the lowermost end of the replacement post section with the post receiving member and the uppermost end of the replacement post section with the lowermost end of the undamaged post, securely attaching a first connection member to the uppermost end of the replacement post section and the lowermost end of the undamaged post and securing the lowermost end of the replacement post section to the post receiving member and detaching the jack from the pallet rack frame and removing the jack.

The inventive repair kit is very cost effective, more efficient than presently known pallet rack frame repair kits and provides permanent repairs because it can withstand high impact and includes the capability of impact deflecting when used with a deflection guard. Indeed, repair of a damaged post of a pallet rack frame utilizing the present invention results in a frame that is significantly more robust than the original rack frame prior to the damage.

Additionally, unless overriding factors inhibit use of the inventive kit as described, such as excessive load on the frame, or major or extensive damage to one or more of the upright posts, the damaged pallet frame can be repaired without necessitating the removal of the stocked items from the pallet rack frame.

Another feature and a distinct advantage of the present inventive freestanding rack frame is the ability to repair a damaged upright post without on-site welding and requiting only mechanical connection steps after cutting of the damaged sections of the upright posts.

Still another feature and desirable characteristic of the present inventive repair kit is that because each repair replacement post is customized in length at the repair site, there is no need to maintain a large inventory of different sizes of replacement posts, one each to fit varying sizes of the damaged upright posts that are removed. Moreover, because only those sections of the preplacement post that is required for the repair is used from a blank of up to 20 feet long, there is no excess scrap that results in the repair process.

The method of use of the repair kit is also novel in that the repair kit is designed to replace the damaged lower post section of the pallet rack frame. The damaged section of the pallet rack frame is removed, by using a suitable cutting tool such as a power saw. The repair kit is used to cut only the exact length of the replacement post that is need to fill the void between the new footplate and the remaining rack frame posts. The replacement post is inserted in the gap between the top of the footplate and the pallet rack is mechanically spliced to the repair kit replacement post. The repair kit does not, in any way, use the remaining posts of the pallet rack for support, nor decreases the impact capacity of the repair kit replacement posts. The repair kit reinforces, strengthens, captures and bonds to the repaired frame by essentially permanent mechanical connections to provide a repaired pallet rack frame that is integrally complete and mis even stronger and more resistant to damage than the original frame. None of the prior art methods known heretofore teach the inventive modular kit as claimed.

BRIEF DESCRIPTION OF THE DRAWINGS

The present invention will now be discussed in further detail below with reference to the accompanying figures in which.

DETAILED DESCRIPTION OF THE PREFERRED EMBODIMENTS

Figure 1:
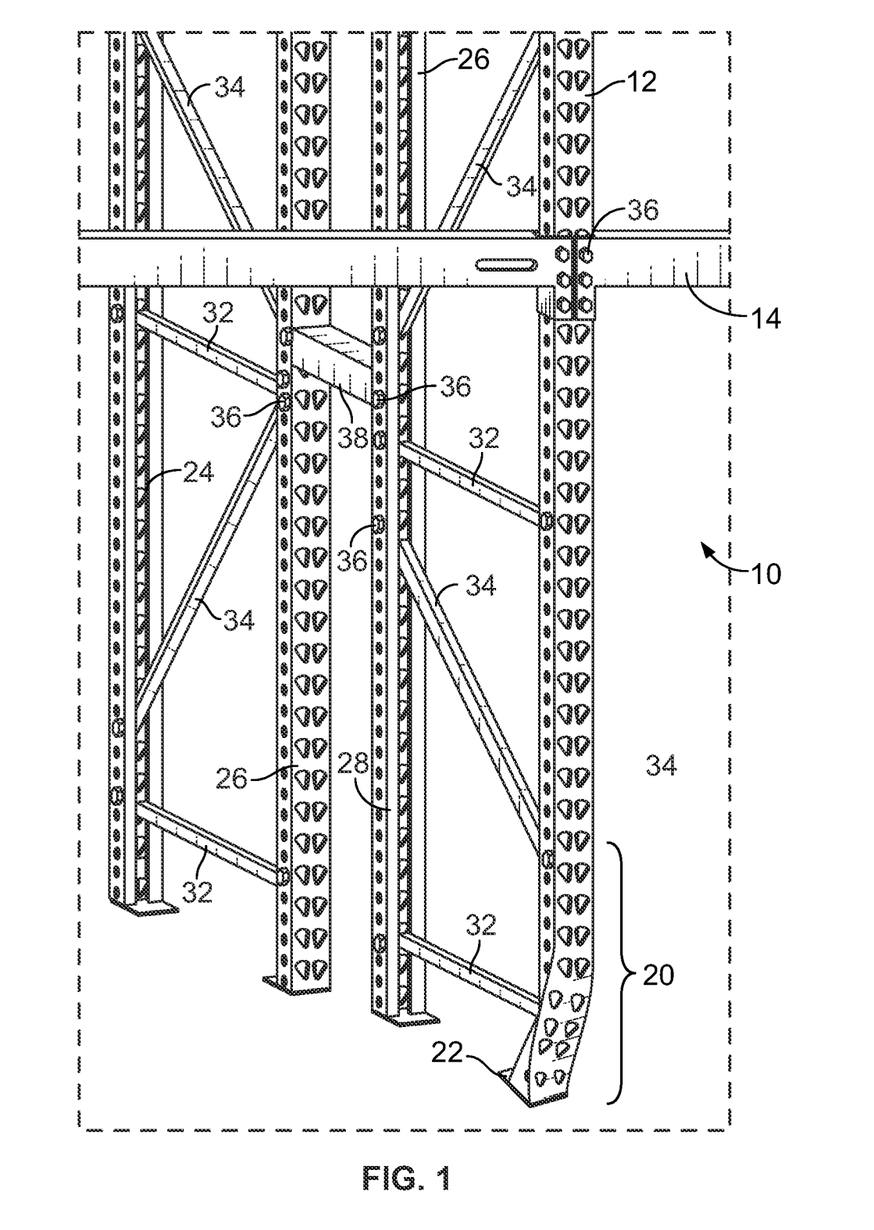
FIG. 1 is a perspective view of a pallet rack frame showing an upright post that has been damaged.

Referring now to FIG. 1, a rack frame 10 is shown in a first stage of the process of repairing the damaged portions 20 of the rack frame 10. Illustrated is a standard pallet rack frame 10, which has had an upright post 12 that has been damaged, for example, by an impact from a fork lift truck (not shown) or from some other cause, such as natural wear or corrosion. The damaged section 20 of the upright post 12 is indicated as being out of position and bent, but the damage could be due to other causes, for example, the damage may be to a straight post end that has had severe enough corrosion that requires replacement to maintain safety within the workplace of the storage facility in which the pallet rack frame 10 is disposed.

The present invention is a freestanding, unwelded assembly constructed from fabricated steel components similar to those of other rack frame repair kits with the exception that the repair kit of the present invention is a modular one that provides increased flexibility and retains efficiency, effectiveness, and great stability to the repaired rack frame. The repair kit is used to replace a damaged lower section on a structural or roll-formed industrial pallet rack frame and is an alternative to a complete frame replacement or a field welded spliced frame section. The repair kit normally does not require complete unloading of goods which are stored on by the frame, as would be required when a complete frame replacement is done.

The repair kit does not require any field welding as a welded splice requires, making this a much-desired repair in a hazardous material, food, or drug warehouse, or where welding permits are required. The kit provides for alternative to welded repairs, and essentially replaces only the damaged section of the pallet rack with structural equivalents or stronger in replacement of the sections of the uprights of the pallet rack frame that were damaged and require repair. The repair kit is a very cost effective and permanent repair due to its high impact resistant capabilities. Also, it is flexible enough in the modular construction that other parts can be added, such as deflection members or guards (not shown), etc., that would not impede the operation of and work in conjunction with the repair kit.

The repair kit is operationally designed to replace the damaged lower front facing upright post section of the pallet rack frame that has been damaged as described above, although it can also be used to replace a rear (24; FIG. 1) or intermediate (26, 28; FIG. 1) post if replacement of these are required. It is not contemplated that impact damage from fork lift trucks can occur at the rear or intermediate locations, but damage can occur by other mechanisms, such as corrosion damage or pressure load wear and tear. The damaged section of the pallet rack frame is cut away and removed, the repair kit is inserted and the pallet rack is mechanically spliced to the replacement post of the repair kit. The repair kit does not, in any way, use the undamaged back leg of the pallet rack to support, or increase the impact capacity of the repair kit, when the front facing upright post is being replaced. The repair kit, together with connection of the existing braces to the repair kit, reinforces, strengthens, captures and bonds to the repaired frame to provide in most case a frame that is stronger and more robust than the originally installed one.

It should be understood that for a damaged upright post, the remaining portions of the frame 10 are not damaged, and continue to exhibit structural integrity such as the rack frame 10 had prior to the damage to the upright post as shown. That is, the inventive repair kit 100 (FIG. 7) is utilizable to replace only the damaged portion 20 of the upright post and retaining the replacement kit to support the rack frame 10 above the cut end 44 in order to allow continued use and operation of the rack frame 10 as originally intended. The repair kit 100 provides for a robust supplemental structure that is in most respects stronger than the original structure prior to the damage. Moreover, because of the modular features of the present invention, the repair kit 100 can be customized to each replacement job to replace only that portion 20 of the rack frame 10 that requires replacement, and no more. This eliminates several problems with existing repair kits, including the need to transport a number of different and standard sized replacement post sections so as to reach the size of one of the standard sized replacement posts on hand to each job depending on the requirements, and to cut out and remove a section of the upright post above the damaged portion. This may require the removal of a substantial portion of the damaged upright post 12 well above the damaged portion 20, leading to unusable scrap, waste and inefficiencies.

Referring again to FIG. 1, rack frame 10 further includes several elements that support and bind the rack frame 10 into an integral and robust structure that is capable of bearing the weight of the items that are stored on the level or horizontal surfaces (not shown) normally disposed on and between crossbeams 14. Neither the horizontal surfaces and items that are normally stored thereon are shown in the drawings for simplicity of illustration of the invention. Support braces comprise horizontal support braces 32 that connect adjacent upright posts 12, 24, 26, 28, as well as diagonally extending support braces 34 that provide lateral and vertical support, which together further provide a rigidity and binding capability to the structure.

Support braces 32, 34 are connected to the upright posts 12, 24, 26, 28 by appropriate connectors, such as bolts 36 extending through the body of each upright post at appropriate apertures 33, 35 and further connected by nuts (not shown). Additional structural support between adjacent rows of rack frame 10 may be provided by cross supports 38 also connected by bolts 36 to the upright posts. The support structure of the remaining undamaged pallet rack frame 10 described and illustrated are essentially identical for all embodiments and will not be described again below with referenced to the other embodiments. While not shown in the drawing figures, additional support may be provided, depending on a need for additional support, by horizontal support braces extending in the same general direction as crossbeams 14 between adjacent upright posts and connecting the structure robustly.

Damaged section 20 of the pallet rack frame 10 is shown in FIG. 1 as being attached and providing partial and unsafe support to the pallet rack frame 10. As mentioned above, the damage to the rack frame 10 may result from a wayward fork lift truck, by impact from an item that has fallen from storage in the pallet rack frame 10 or simply from normal wear and tear or natural corrosion occurring from high humidity, or from caustic cleaning materials that are used periodically for cleaning the floor upon which the pallet rack frame 10 rests. In all of these cases, as well as others, a bent or corroded post 12 results in unsafe and possibly dangerous conditions that require attention and repair to avoid injury or risk to the personnel working in the facility where the pallet rack frame 10 is used, such as warehouses, manufacturing plants, chemical plants, power plants, and other like facilities.

Figure 2:
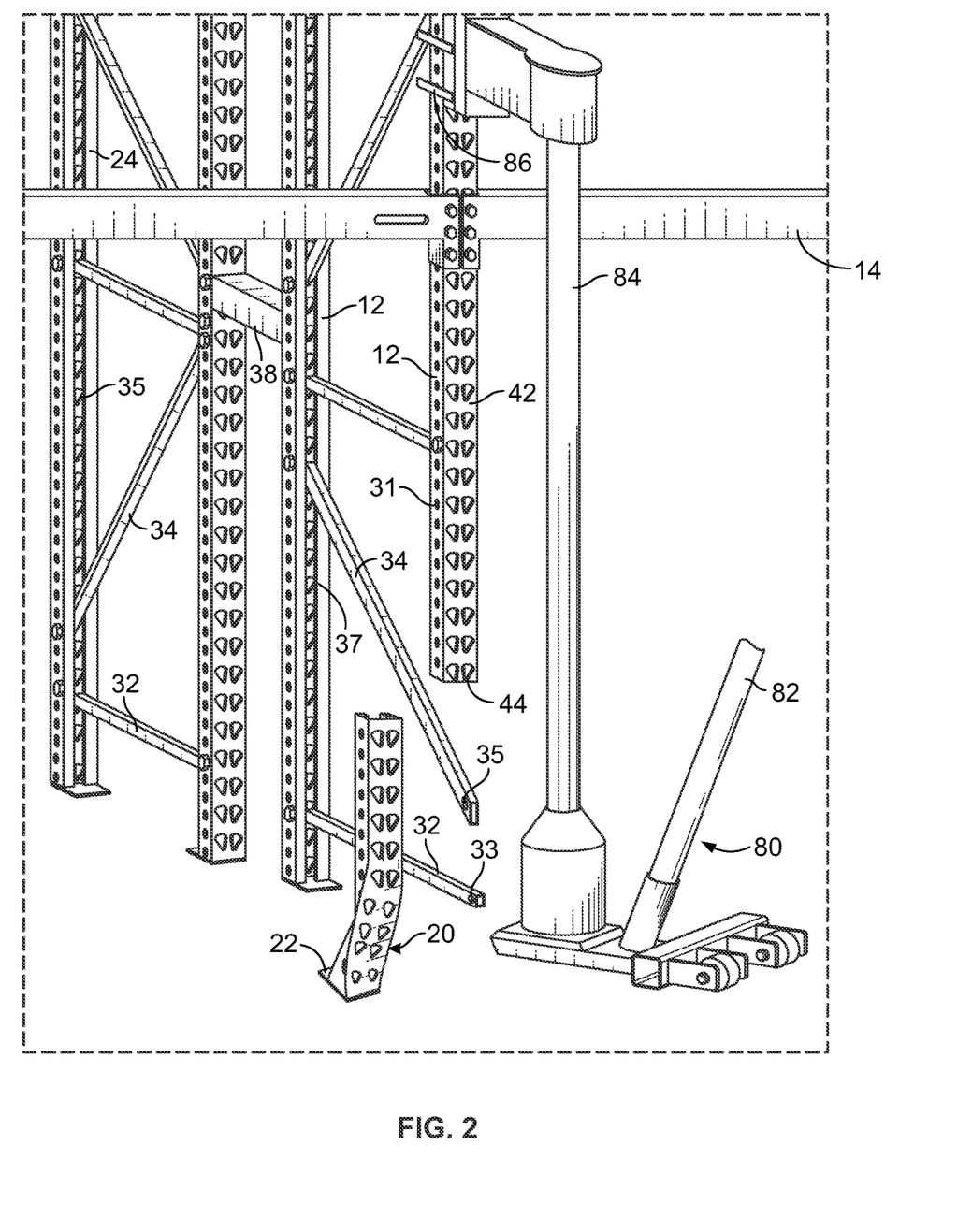
FIG. 2 is a perspective view of a pallet rack frame showing the removal of a damaged upright post.

Referring now to FIG. 2, a second stage in the process of repairing a damaged rack frame 10 is shown, in which the damaged portion 20 of the rack frame 10 has been cut at a point above the damaged portion, designated as end 44. The integrity of the remaining pallet rack frame 10 above end 44 essentially intact and can continue in operation as long as the pallet rack frame 10 below the cut end 44 is sufficiently supported. That is, the portion that is cut away is only the damaged portion 20, and the post 12 above the cut 44 is sufficiently intact to support the rack frame 10 if the post 12 is itself properly supported below the cut.

In FIG. 2, horizontal brace support 32 and diagonal brace support 34 are shown as not having been damaged, and removal of bolts (not shown in FIG. 2) and thereby detaching the support braces from the damaged portion 20 permits the easy removal and disposition of the damaged portion 20. Conversely, should the impact that has damaged the damaged portion 20 also have damaged one or more of the support braces 32, 34, then those support braces can be removed by disconnecting them at the connection to, for example and as shown in FIG. 2, the adjacent upright post 28, and these can be removed together with the damaged portion 20. Of course, to maintain support and strong structural integrity, these will require replacement as well in the repair of the damaged portion of pallet rack frame 10.

It should also be noted an impact that has damaged the upright post 12 may also have damaged a base 22 providing connection of the post 12 to the floor or underlying surface on which the rack frame 10 is disposed. Thus, in most instances, replacement of the damaged portion 20 will also entail removing and replacing the base 22 on which the upright post 12 is supported and connected to the floor so as to inhibit lateral motion of the repaired post 12 when rack frame 10 is in operational use.

As shown in the all drawing Figures, the upright posts including front upright post 12, rear upright post 24, and intermediate upright posts 26, 28 and the upper and lower cross beams 14, and the support braces 32, 34 are preferably made from rectangular tubular metal stock. As shown, all posts 12, 24, 26, 28 have an anchor base 22 attached to the lower end of the posts with the connection to the extending toward the interior of the frame. Each of the upright posts 12, 24, 26, 28 is normally defined by a U-shaped channel 37 extending along its length, the open end of the channel 37 having a size and orientation that admits insertion of an end of the support braces 32, 34, and having a through hole 33, 35 respectively, which is capable of alignment for passage of the bolt 36 through the brace 32, 34 and through the outer side walls of the respective post. Toward that end, a bolt aperture 33, 35 at each lateral end of the supports 32, 34 is oriented to receive and pass therethrough one of the bolts 36 as well as similar apertures 31 in the side walls of the upright posts 12, etc.

When the rear 24, or intermediate 26, 28 upright post of the pallet rack frame is damaged, e.g., by corrosion, etc., the inventive repair kit can also be used without requiring use of any other extension or supplemental elements. Use of the inventive repair kit for a rear or intermediate upright post (24, 26, 28) is essentially identical for those of the front upright posts 12 as described and illustrated herein, although access to those elements of rack frame 10 may be slightly more difficult. Referring briefly to FIG. 2, the pallet rack frame 10 is shown after the step of having cut way the damaged section 20 of the post 12, and removed it therefrom.

Figure 3:
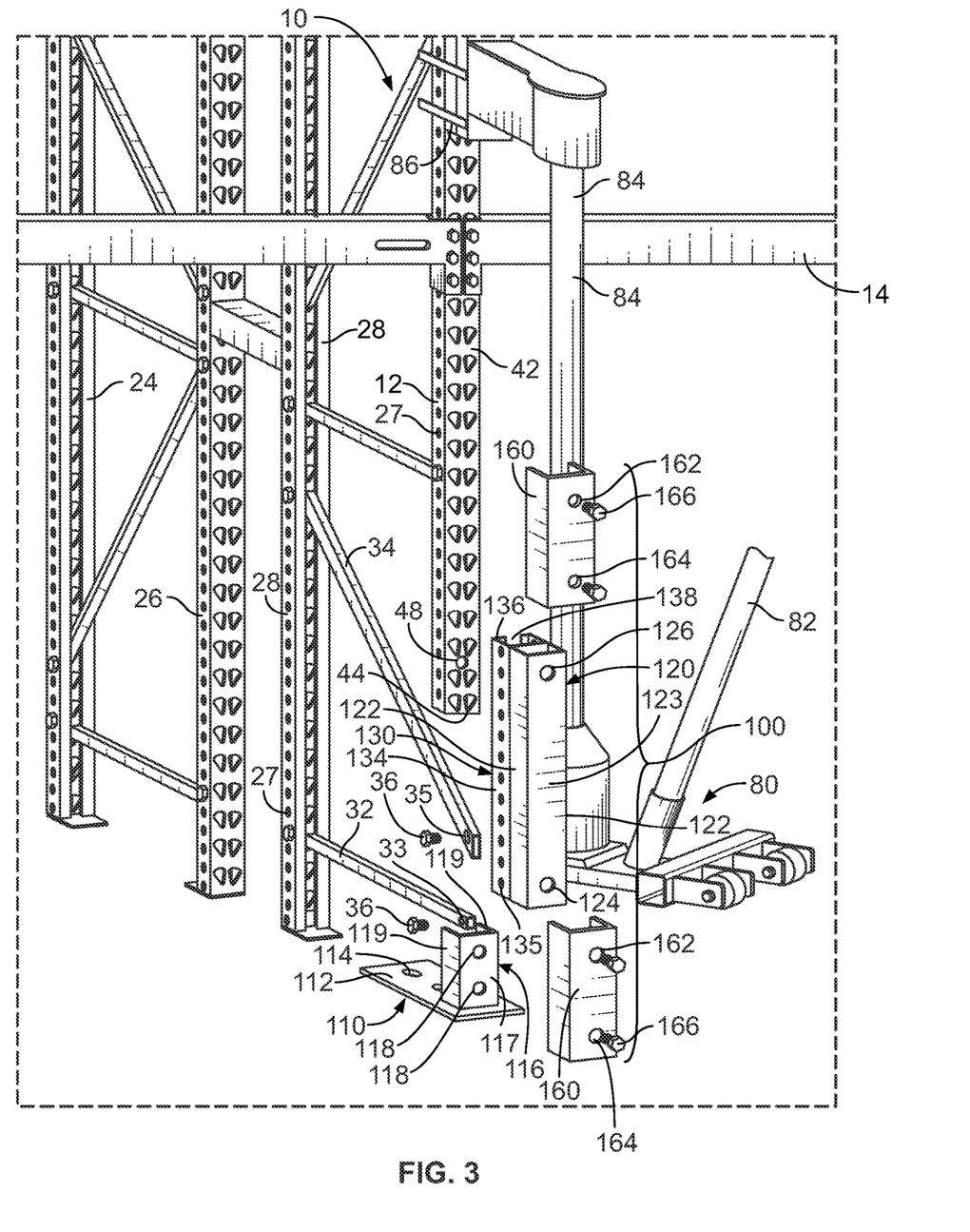
FIG. 3 is a perspective view of a pallet rack frame showing use of a first embodiment of the inventive kit, in a partially exploded view, having a replacement base and a replacement post in the process of being installed to replace the damaged upright post.

Referring now to FIG. 3, a first embodiment of the inventive pallet rack repair kit 100 is shown in a partially exploded view. A second embodiment of the repair kit 200 is shown in an exploded view in FIG. 7, as will be described below. That is, while the repair kit 100 in FIG. 3 is partially exploded, the rack frame 10 is shown assembled and the damaged portion 20 (FIG. 2) of the upright 12 is removed. The repair kit 200 is shown in an exploded view in FIG. 7. Where there are similar parts between the two embodiments of the repair kits 100, 200, the same numbers will be used herein, but with a different first numeral, the first embodiment parts being in the 100 series and for the second embodiment in the 200 series. Where there are differences in the two embodiments, different numerals subsequent to the first will be used.

Figure 7:
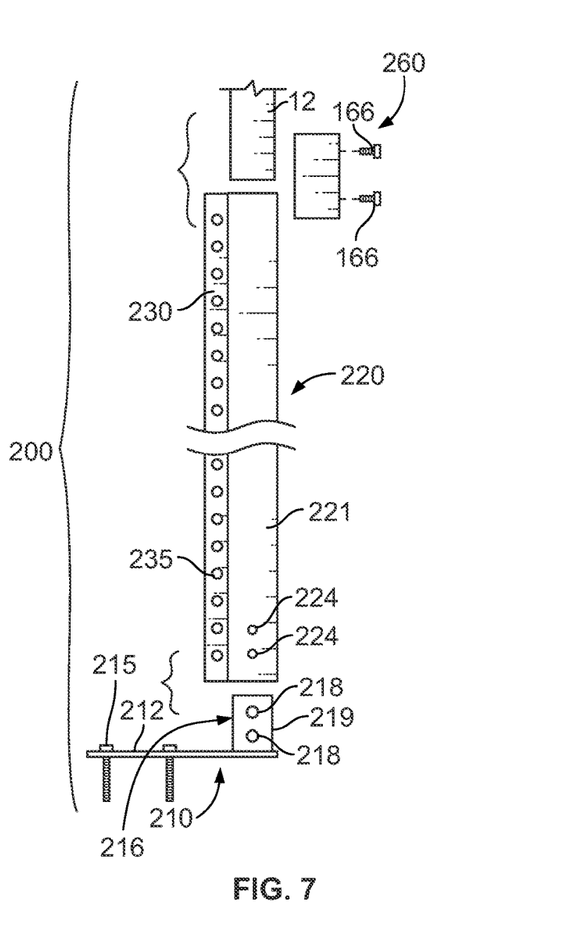
FIG. 7 is an exploded side view showing the alternative embodiment of the inventive kit illustrated in FIG. 6.

It is important to note that the embodiment of the inventive repair kits 100 and 200 shown in FIGS. 3 and 7, respectively, are both modular in form and include several discrete and interchangeable parts that can be used and replaced separately. However, these modular and interchangeable elements together define the repair kit that is capable of replacing the damaged portion 20 of the pallet rack frame 10. The modular aspect of the repair kits 100 and 200 provide a high level of flexibility to the use of the repair kits as will be explained below when discussing the process of using them. The other significant feature of this invention is that no on-site welding is required for use of the repair kit 100, 200.

The inventive modular repair kit 100 illustrated in FIG. 3 comprises several parts that work together to define a replacement upright post portion to stand in for and fully and robustly replace the damaged portion 20 that has been removed (FIG. 2). The modular repair kit 100 includes a base 110 having at least one connecting member, a replacement post assembly 120 and at least one connecting element, a clamp member 160 having an upper connecting aperture 162 and a lower connecting aperture 164, used to connect the replacement post to the base 110 at a lower end and to the remaining undamaged portion of upright post 12 of the pallet rack frame 10 at an upper end above the cut 44. The undamaged portion of the rack frame at post 12 includes a front face 42 and cut end 44 where the cut has been made to enable removal of damaged portion 20. Each of these elements will be discussed in greater detail below, with a decided emphasis on the connections of the elements to the existing undamaged structure so as to replace the damaged section 20 of the upright post 12.

The base 110 comprises a two major parts, a footplate 112 having at least one throughhole 114 for insertion of a connecting member (not shown in FIG. 3) for connecting the footplate 112 to the ground or floor on which the pallet rack frame 10 rests. These connecting members are best seen in respect of the second embodiment shown in FIGS. 6 and 7, and may comprise large concrete screws or bolts 115 (FIG. 3) or 215 (FIG. 7) attaching footplates 112, 212 rigidly to the floor to inhibit lateral motion of the bases 110, 210, respectively. Connecting footplate 112 to the floor by an appropriate connection, such as concrete screws 115, 215 (FIGS. 3, 6, 7 and 8), inhibits easily displacement in either lateral or vertical directions and provides an anchor for the base 110 on which the replacement post assemblies 120, 220 are supported and to which they are rigidly secured.

The base 110 further includes an upwardly extending post receptor pin 116 that extends perpendicularly of the footplate 112 in a direction opposite from the floorplate 112 to the floor engagement interface. That is, when the floor plate 112 is placed on the floor, the post receptor pin 116 provides an anchor on which a replacement post assembly 120 is disposed and is connected thereto to retain and rigidly secure the replacement post relative to the floor. As will be described below, the replacement post assembly 120 itself has connections at an opposite end from the receptor pin connection to connect to the remaining undamaged portion of the pallet rack frame 10 adjacent post cut end 44, as shown in FIGS. 2, 3. As shown in FIG. 3, post receptor pin 116 is in the shape of a square cornered U-shape when viewed in cross-section, with the connecting middle of the U shape defining a front facing wall 117 extending perpendicularly upwardly from the footplate 112 at a front position thereof. Wall 117 includes at least one, and preferably two, connection apertures 118 ready and oriented for insertion of bolts 166 as will be explained below.

Replacement post assembly 120 comprises a number of elements that contribute to providing a sturdy and robust replacement for the damaged and removed upright section 120 of the post 12, including replacement post member 122, comprising a metal U-shaped, square or rectangular tubular material. Replacement post member 122 has a front facing wall 123 having two connection apertures 124, 126 at either end of the section 122 providing for connections to the base 110 and to the remaining undamaged post 12, respectively.

The size of the post receptor pin 116 is sufficient to provide a base or anchor for supporting the U-shaped replacement post assembly 120 in a sturdy and robust connection after it is inserted into the space between receptor pin 116 and cut end 44 of upright post 12. To provide this feature, the lateral dimension of the U-shaped pin 116, that is, the width between the two outer side walls of the two arms 119, provides pin dimensions that essentially mirror the three walls 121, 123 defining the U-shaped replacement post section 122. Similarly, connecting clamp member 160, having a U-shape, has inner wall dimensions that permit the U-shaped space within the two side walls 121 defining the U-shaped connecting clamp member 160 to fit snugly over and engage the outer side walls of replacement post section 122 so as to secure the connecting clamp member 160 to replacement post assembly 120 and the pin 116 by means of bolts 116. To obtain this capability, the inner walls of the two arms of the U-shaped connecting clamp member 160 should have a dimension between them that is slightly larger than the lateral dimension between the outer side walls of replacement post section 122 so as to accommodate the encompassing function of the connecting clamp member 160.

In the installation, the U-shaped replacement post member 122 is placed above receptor pin 116 so that front facing wall 117 of pin 116 aligns with front facing wall 123 of replacement post member 122 to present a smooth surface with a joint at the ends of the front facing walls. Simultaneously, apertures 118 and 124 are aligned to enable the connection to each other by the first connecting clamp member 160.

Once the front walls 117 and 123 are aligned to present a contiguous surface, first connecting clamp member 160 is fit over the top portion of the replacement post 122 and around the receptor pin 116 so that the upper aperture 162 aligns with aperture 124 of the replacement post 122 disposed in a central location of the wall 123, and the lower aperture 164 aligns with an aperture 118 of receptor pin 116. Once apertures are aligned, bolts 166 are inserted through the pair of aligned apertures 164, 124 and 162, 118 and securing nuts (not shown) are attached to the bolt ends at a position within the U-shaped enclosure of the receptor pin 116 defined by walls 117, 119 to secure the first connecting clamp member 160 in place.

Once first connecting clamp member 160 is securely attached and secured, the disposition of the replacement post 122 relative to receptor pin 116 is assured and no lateral or vertical motion between these two members can occur. As in the first connecting clamp member 160, also having a U-shape, the two inner wall dimensions permit the U-shaped space within the two side walls 121 defining the U-shaped connecting clamp member 160 to fit snugly over and engage the outer side walls of the undamaged post 12 above cut 44 so as to secure the connecting clamp member 160 to undamaged post 120 and means of bolts 166. To obtain this capability, the inner walls of the two arms of the U-shaped connecting clamp member 160 should have a dimension between them that is slightly larger than the lateral dimension between the outer side walls 27 of post 12 so as to accommodate the encompassing function of the connecting clamp member 160.

The connection of replacement post 120 to the remaining parent structure, that is, to undamaged post 12 above cut end 44 where the damaged portion was cut and removed, is accomplished in the first embodiment shown in FIG. 3 by using a similar connection as that to the base 110. The specified length of the replacement post 120 already has been measured, cut and inserted between the lower end of the undamaged post 12 and the base 110, and the replacement post has been secured to the base 10. An end of replacement post member 122 opposite to that of the base 110 is attached to the remaining undamaged upright post 12 by means of second connecting clamp member 160. To provide this connection, front wall 123 of replacement post 120 is aligned with abutting front wall 42 of remaining post 12 to present a contiguous surface, similarly to how front wall 123 abuts and presents a contiguous surface with the front wall 117 of receptor pin 116 for connection of the first connecting clamp member 160. Once the front walls 42 and 123 are aligned to present a contiguous surface, second connecting clamp member 160 is fit over the top portion of the replacement post 122 and the bottom end 44 of the post 12 so that the upper aperture 162 aligns with an aperture 48 disposed in a central location of the wall 42 of post 12, and the lower aperture 164 aligns with upper aperture 126 of replacement post member 122. Once aperture alignments are assured, bolts 166 are inserted through the respective pair of aligned apertures 126, 164 and 162, 48 and securing nuts (not shown) are attached to the bolt ends to secure the second connecting clamp member 160 in place. Once both first and second connecting clamp members 160 are attached and secured, the load of the rack frame 10 above the end 44 is borne by the replacement post member 122 and the new base 110.

As provided therefor by the inventive kit 100 before installation is to begin, a reinforcement channel 130 is attached to the back wall or to the open end of the U-Shaped post replacement member 122, which may be attached by mechanical means such as by welding or spot welding. Reinforcement channel 130 provides both a rigid backing to the replacement post member 122 and also includes attachment points for mechanical connections to the proximal ends of the support braces 32, 34. The reinforcement channel 130 preferably comprises an open U-Shaped tubular metal material, thereby to provide space within the arms of the U-Shaped form for insertion of the ends of the support braces 32, 34. While the reinforcement channel 130 is shown in FIG. 3 as a four-sided tubular member defining an enclosure 137 with a slot 138 extending the length of the wall 136, alternative constructions will readily come to mind of an installer or manufacturer of pallet repair kits. For example, a regular three-sided U-shaped tubular cross-sectional shape may be used so long as sufficient room is provided to insert the ends of support braces 32, 34 into the receptacle between the two side walls 134 of reinforcement channel 130. A plurality of evenly spaced through apertures 134 disposed along the length on either side walls 134 provide for insertion of bolts 36 that secure and retain the support braces to the reinforcement channel 130.

One aspect of the invention, not necessarily comprising a part to the repair kit 100, is a supporting jack 80 (FIGS. 2 and 3) which supports the pallet rack frame 10 while the installation is in progress. Jack 80 is shown as a hydraulic lift jack but may comprise any type of jack, such as an electric actuating jack, etc. The significance of jack 80 is that it is sturdy and robust to enable it to jack up and support pallet rack frame 10 while the damaged portion 20 of rack frame 10 is removed and installation proceeds. Jack 80 generally is a standard upright jack, comprising a handle 82 for actuating the raising of a column 84 and a pair of constraining arms 86 oriented for and capable of engaging a portion of the rack frame 10 well above the end 44 of undamaged post 12, so as to be able to support and retain the undamaged portion of post 12 and the rack frame 10 above it. The preferable point of attaching the jack 80 to the rack frame 10 is at above the end 44 of undamaged post 12, although other attachment locations (for example, see FIG. 9) may be used without departing from the invention.

By operation of the jack 80, the arms retaining and lifting the post 12 to a suitable position, jack has sufficient sturdiness to support not only the weight of the rack frame 10 but also the weight of that portion of the items stored on the pallet rack frame 10. On a general scale, this permits the repair of a damaged post 12 without necessitating the unloading of the rack frame 10 and thus effecting a more efficient and quicker repair process than is normally encountered when following the prior art repair method of replacing a complete post with a new and essentially identical post 12. Referring again to FIG. 3, once the replacement post 120 has been secured in place by the connecting clamp members 160, the jack is deactivated and can be removed from the site, as shown in FIG. 4.

Figure 4:
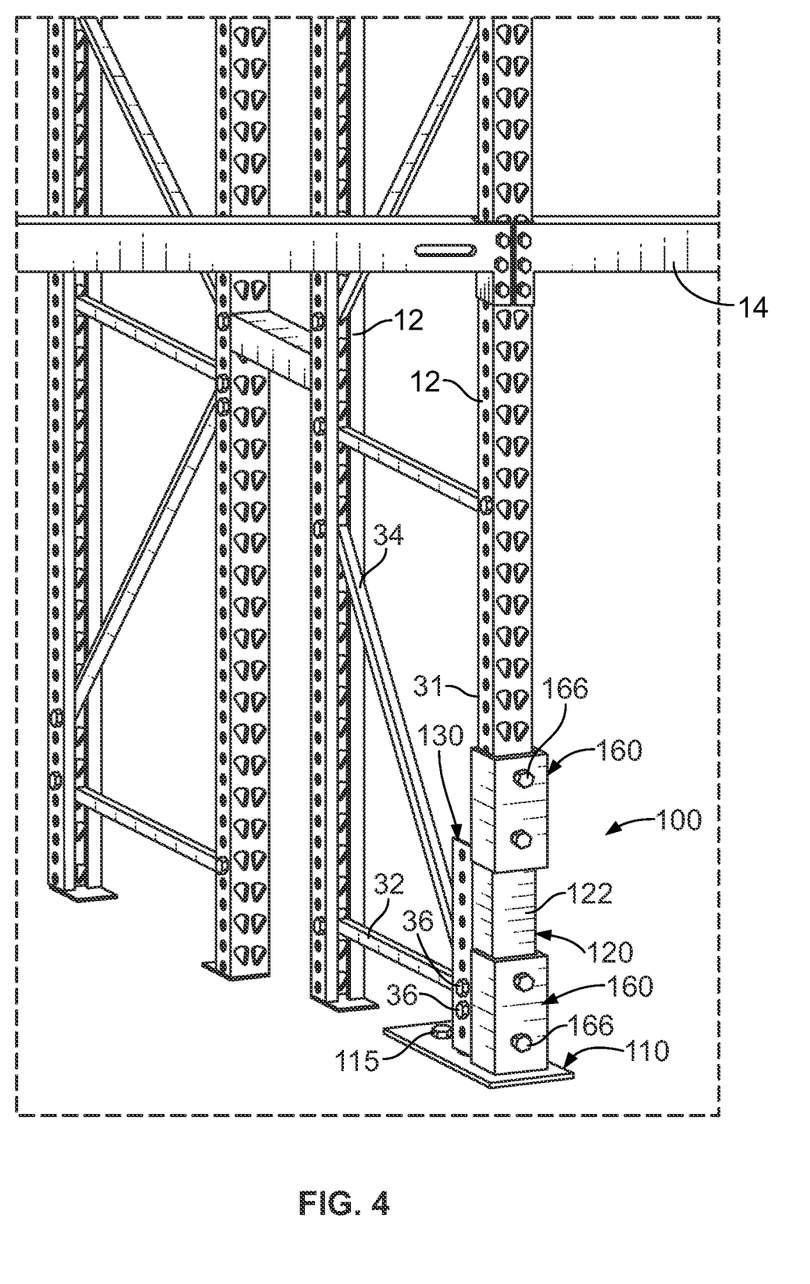
FIG. 4 in a perspective view shows the pallet rack frame after installation of the first embodiment of the inventive kit of FIGS. 2 and 3.

FIG. 4 illustrates in a perspective view a repaired pallet rack frame 10 in which all of the modular elements of the repair kit 100 have been installed and the pallet rack frame is capable of providing its function as if the damage has not occurred. In most instances, the repaired pallet rack frame is stronger, sturdier and capable of supporting the rack frame and the items stored thereon than the original rack frame before the damage occurred. The assembled kit 100, comprises the base 110, attached to the floor by one or more bolts (115), receptor pin 116, the replacement post assembly 120 and the two connecting clamp members 160. Together these elements are secured by means of the bolts 166 and corresponding nuts, having ridged washers (not shown) to inhibit the bolts from loosening once they are in place.

Figure 6:
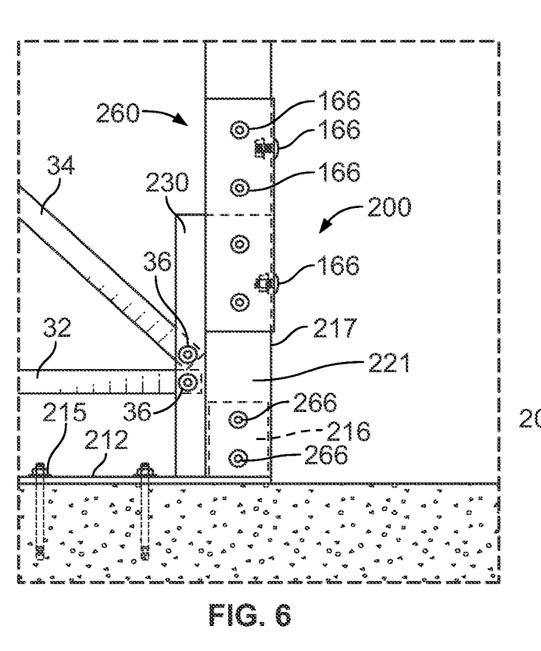
FIG. 6 is a side cutaway view showing an alternative embodiment of the inventive kit after it has been installed to replace the damaged upright post.

The installed repair kit, and as shown in FIGS. 3 and 4, includes the connections of support braces 32, 34 to the replacement post assembly 120. Keeping in mind that the original installation connected the ends of braces 32, 34 having bolt apertures 33, 35 respectively, to the original post 12 which, as of the installation, has had the damaged portion 20 removed, the points of connection to the replacement post assembly are no longer available. Thus, the reinforcement channel 130 is provided for both a reinforcing function, to reinforce and make the replacement post 122 more rigid and stable, as well as, through the series of apertures 135 along its length extending down both of its lateral wall 134, provides points for attachment of the ends of support braces 32, 34. That is, the reinforcement channel 130 is a U-shaped member with the open end 237 (FIG. 8) facing away from the front of the pallet rack frame 10, which open end provides ingress for receiving the ends of the two support braces 32, 34 (FIG. 6). The open end provides access to the enclosure 237 within the reinforcing channel 230 that is defined by the two side walls 234 and a frontmost wall 239.

As the ends are inserted into the open channel between walls 134, the apertures 33, 35 are aligned with an appropriate pair of apertures 135 on either side wall 134 and a bolt 36 is inserted through the aperture 135 on one side wall 134, through the aperture, 33 or 35, depending on the support brace 32, 34 which is being connected, and through the opposing aperture 135 on the other side wall 134, after which it is secured by screwing a nut onto the bolt 36. While this illustrative example of connecting the support braces 32, 34 to the replacement post assembly 120, other methods will become readily apparent to a person who is skilled in then art, and this exemplary embodiment is not limiting to the present invention.

Referring now to FIGS. 5-8, an alternative configuration second embodiment of the inventive repair kit 200 is shown. FIG. 7 shows the inventive repair kit 200 in an exploded side view, with the post replacement member 220 being shown having dimensions that are not predetermined, but can be variable as the need arises. It should be noted that although the embodiments are shown having identical identification numerals and near identical configurations, there are slight variations between the various configurations that will be pointed out below when discussing the Figures individually.

Repair kit 200 is a variant of the embodiment 100 of FIGS. 2, 3 and 4, and includes a side wall connection of the replacement post section 220 to the variant receptor pin 216. That is, instead of the connection apertures being disposed in the front facing wall 217, the apertures 218 extend through both side walls 219 of receptor pin 216. Consequently, corresponding apertures 224 in the side walls 221 of the replacement post section 212 are disposed to align with the apertures 218 so as to receive appropriate connectors, such as the bolts 266 (FIG. 6) similar to the bolts 166 in FIG. 3, except for the side wall connection.

Another difference with the first embodiment of FIGS. 2-4 is that the dimensions of the pin 216 relative to the U-shaped or rectangular shaped enclosure defined by the walls 221, 223 of the replacement post member 222. The configuration of FIG. 5 contemplates that the size of the post receptor pin 116 is sufficient to provide for insertion into a socket formed by the three walls of the U-shaped replacement post assembly 220 in a sturdy and robust connection. That is, instead of the replacement post member 222 being disposed on the upper edge of the receptor pin 216, the enclosure is defined by dimensions and is oriented to provide a socket that fits over the receptor pin 216 so that the bottom edge 225 of the replacement post member 222 rests directly on the footplate 212 of receptor pin 216. This entails that the measurement for the longitudinal dimension of the replacement post assembly 220, including both the replacement post member 222 and the reinforcement channel 230, will be inserted in the pallet rack frame between the footplate 212 and the cut end 44 of the remaining undamaged upright post 112. In the installation of the replacement post assembly 220 within the frame, the socket formed by walls 221, 223 and the open end over which the reinforcement channel 230 has been attached, are inserted over pin 216 and simultaneously rotated in the directions of the arrows so that bottom edge 225 engages the surface of footplate 212. Simultaneously as a result of the rotation, the top edge of the post replacement member 222 reaches a position directly underneath the cut end 44 of upright post 12 and the surfaces become contiguous as described in relation to the first embodiment of FIGS. 2-4 above. The completely inserted socket connection is best seen in the side view of FIG. 6.

Figure 5:
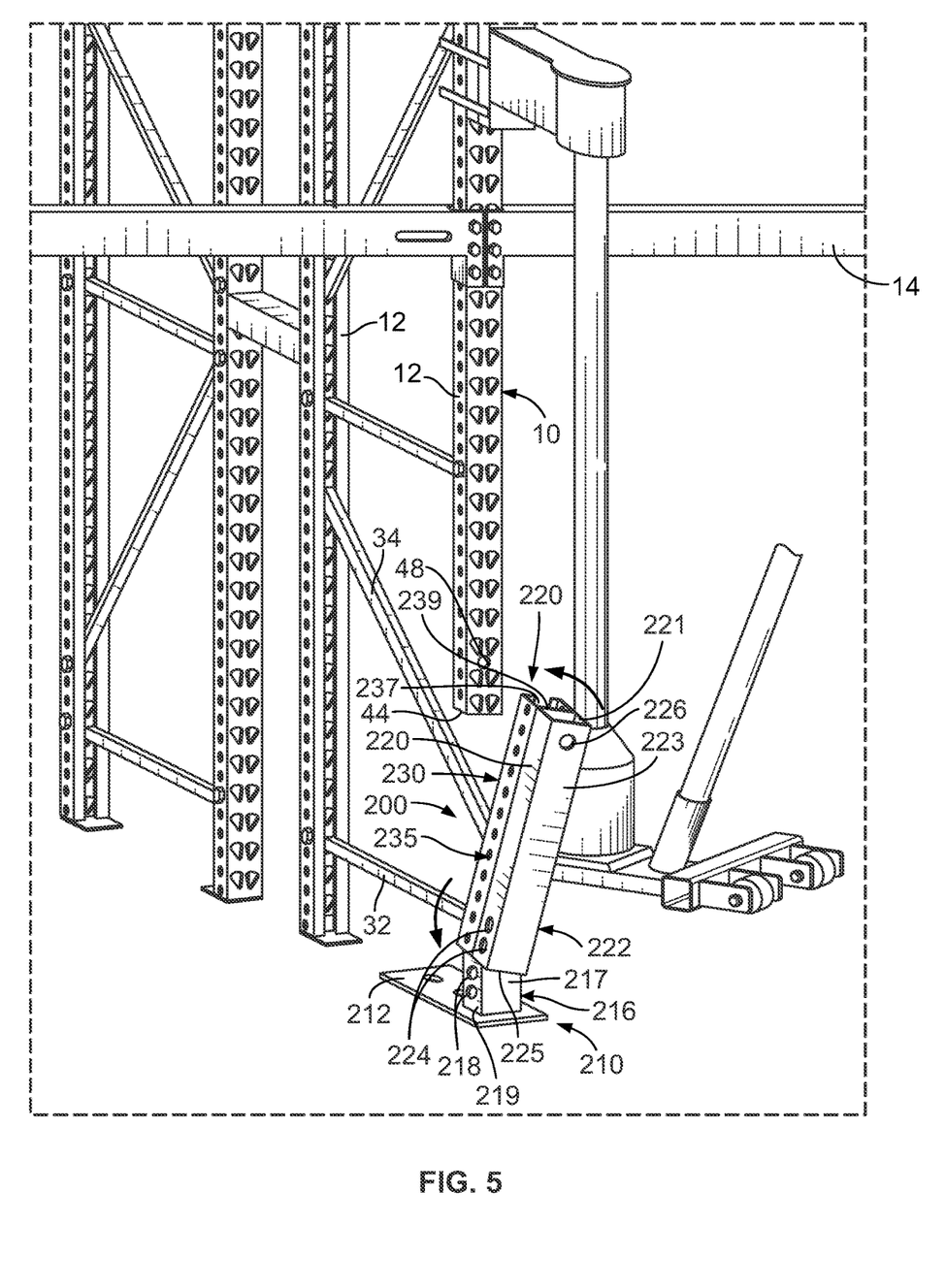
FIG. 5 is a perspective view of a pallet rack frame showing a second embodiment of the inventive kit having a replacement base and a replacement post in the process of being installed to replace the damaged upright post.

The next step in the installation process, providing for connections of the two ends of the replacement post member 222 to the respective connection points will be described with reference to the second embodiment of FIGS. 5 and 6. While it should be understood that a side connection of the lower end of replacement post member 222 to receptor pin 216 is shown in FIG. 5 and the front connection is shown for the upper end in FIG. 6, conversely to that of the first embodiment, any connection configuration is possible. As shown in FIG. 6, the connections are made both by in a front facing wall 217 as well in a side wall 219. The types of connections desired will normally be guided by the site where the pallet rack frame is disposed and its configuration. Thus, any combination of connection configurations is possible and the ones that are shown and described herein are illustrative only.

Referring again to FIG. 5, once the replacement post assembly 220 has been inserted and appropriately aligned, the connections are made. One major difference in the connections is that in the FIG. 5 configuration a connection of the lower portion of replacement post member 222 to the base assembly 210 does not require a connection using the first connecting clamp member. The upper portion of replacement post member 222 is made mostly in accordance with the description of connecting process of the first embodiment (FIGS. 2-4), including the alignment of apertures 226 in front wall 223 of replacement post member 222 and aperture 48 adjacent the end 44 of the upright post 12 for receiving a bolt connection with corresponding apertures (162, 164; FIG. 3) of connecting clamp member 160 (FIG. 3), etc. As the connection of the upper end of replacement post member 222 is not significantly different from the configuration of FIG. 3, it will not be described in detail herein.

The connection of replacement post member 222 to base 110 differs in that no connecting clamp member is used. Rather, the connection of the lower end of the replacement post member 222 is made directly to the pin 216 by an appropriate connecting means. However, it should be appreciated that the connection means as shown is not a significant part of the invention, and any appropriate connection means can be used as will be apparent to one having ordinary skill in the art.

Referring again to FIG. 5, once the replacement post assembly 220 has been inserted and appropriately aligned, and the connection between the upper end of replacement post member 222 to the undamaged portion of the upright post 12 is made, the secure connection of the lower end of replacement post member 222 to the receptor pin 216 is completed. That is, the apertures 224 in the side walls 221 of replacement post member 222 are aligned with the apertures 218 in side walls 219 of the receptor pin 216 enabling a bolt (not shown) of appropriate length to be inserted through the apertures 224, 218 in walls 221, 219, respectively and the bolt is then secured by a nut at the opposed wall 221, not visible in FIG. 5.

Other types of connections of replacement posts to the respective bases are contemplated, for example a snap fit, or interference fit connection, as will be appreciated by those having ordinary skill. A secure connection using a bolt may even not be required, since the socket connection of the replacement post member 222 with receptor pin 216 is maintained by gravity and the weight of the pallet rack frame and stored items thereabove will inhibit lateral motion of replacement post assembly 220 relative to the base 210. As sis described above, the connections 115, 215 of bases 110, 210, etc., to the floor will retain the anchoring function to retain the post in place. However, such a secure and perhaps redundant connection is preferable for safety reasons.

The next step in the process is to connect support braces 32, 34 to appropriate ones of apertures 235 in the side walls of the reinforcement channel 230, similarly to the same above-described connections with reference to FIG. 3. Once the connections have all been made and the replacement post assembly 220 is securely attached to the base 210 and frame 10, the jack 80 can be disengaged and removed from the site, and the repaired frame 10 can then safely resume its former function.

Figure 8:
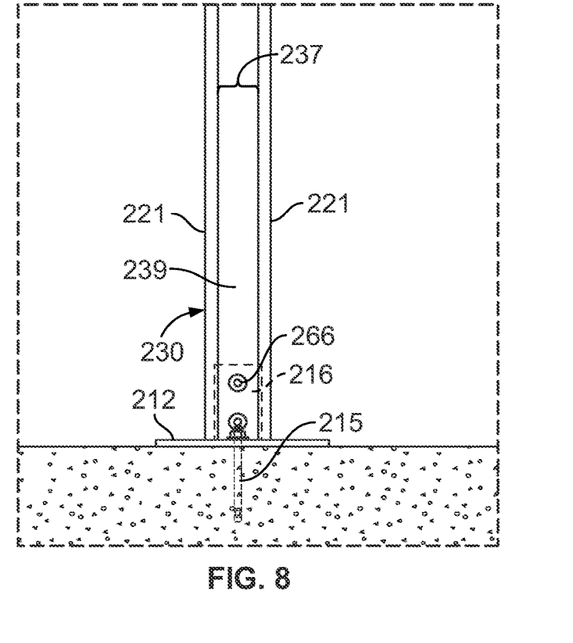
FIG. 8 is a rear cutaway view showing the alternative embodiment of the inventive kit shown in FIG. 6 after it has been installed to replace the damaged upright post with the various connections.
Figure 9:
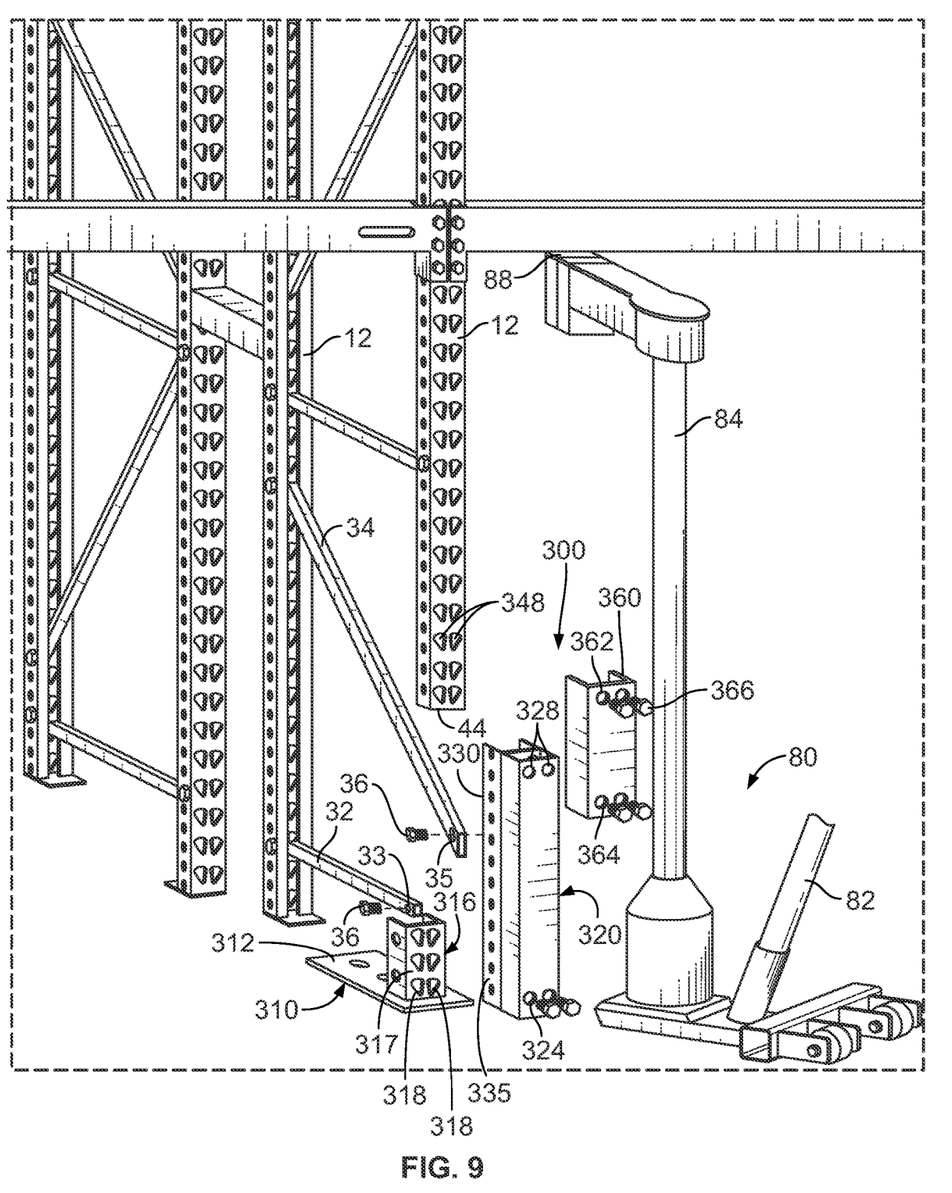
FIG. 9 is a perspective view of a pallet rack frame showing use of yet another alternative embodiment of the inventive kit having a replacement base and a replacement post in the process of being installed to replace the damaged upright post.

Referring now to FIGS. 6-9, minor variations of the above described embodiment of FIG. 5 is shown and described, FIG. 6, being a side cutaway view showing an alternative embodiment of the inventive kit after it has been installed to replace the damaged upright post. FIG. 7 is an exploded side view showing the alternative embodiment of the inventive kit illustrated in FIG. 6. FIG. 8 is a rear partial cutaway view showing the alternative embodiment of the inventive kit shown in FIG. 6 after it has been installed to replace the damaged upright post with the various connections with a slight variation in the length of the replacement post assembly. FIG. 9 is a perspective view of a pallet rack frame showing use of yet another alternative embodiment of the inventive kit having a replacement base and a replacement post in the process of being installed to replace the damaged upright post.

FIG. 7 is an exploded view of the repair kit 200 including all of the parts shown being assembled in FIG. 5, including base 210, replacement post assembly 220 and connecting clamp 260. FIG. 6 shows the fully assembled and installed repair kit 200, showing the bolts 266 inserted into the apertures 224 in side walls 219 of replacement post member 222 and nuts attached to the threaded ends at the opposite side walls of the pin 216 and post 222 through which the bolt 266 extends. The side walls 234 of the reinforcement channel 230 do not include the full array of the apertures 235, but only two apertures 235, one each for the insertion of the bolts 36 used to connect the ends of the support braces 32, 34, are shown. As can be appreciated by those of skill in the art, it is possible to have the walls 234 not have any apertures disposed thereon, the apertures 235 being drilled on site when the position of the apertures 33, 35 of the respective ends of the support braces 32, 34 have been determined at the time of installation.

Referring now to FIG. 8, in which a rear view of the assembled repair kit 200 is shown, each of the side walls 221 of the replacement post member 222 are shown to be slightly greater than the same dimension of the receptor pin 216 (shown in phantom) so that the enclosure defined by the walls 221, 223 and the frontmost wall 239 of the reinforcement channel 230 act as a socket to engage the outer surfaces of the receptor pin 216. It should also be understood that the frontmost wall 239 will also require apertures for a configuration in which the bolts 166 are attached through the front wall 123 as shown in FIG. 3. These holes, both at the lower end attachment to receptor pin 216 and to the upper connections to the upright post 12 can also be drilled on site similar to the apertures 235 discussed above with reference to FIG. 6. It is important to have the bolt 166 extend through the wall 239 so as to provide access to the connecting nut that will engage the threaded end of bolt 166.

Referring now to FIG. 9, yet another embodiment of the repair kit 300 is shown, including similar elements. However, as shown in FIG. 9, some subtle differences are present in this embodiment. Rather than one connection aperture for each of the upper and lower connections in the replacement post member 320, there are two upper connection apertures 326 and two lower connection apertures 324 for receiving the connecting bolts 366 to connect the post member 320 to the existing apertures 318 of the receptor pin 316. Using this configuration avoids having to drill another aperture, such as aperture 48 (FIGS. 3 and 5) in the front facing wall of the upright post 12 because the existing aperture 348 are used for the bolt holes. The remaining configuration and connections are essentially the same as those of one or another of the previously described embodiments.

Another feature in the FIG. 9 embodiment, that can actually be used with any of the other embodiments, is that instead of attaching the arm ends of the jack 80 to the upright post 12 as in the previously illustrated embodiments, the jack 80 has an upwardly facing surface 88 which is brought under one of the cross-beams 14 and the jack thus supports the structure of rack frame 10 through the cross-beam 14. Where there are similar parts between the two embodiments of the repair kits 100, 300, the same numbers will be used herein, but with a different first numeral, the first embodiment parts being in the 100 series and for the third embodiment in the 300 series. Where there are differences in the two embodiments, different numerals will be used.

Still another feature of the invention is illustrated when comparing the different views shown in FIGS. 6-8. The break in the length of the replacement post assembly 220 shown in FIG. 7 is indicative that the length of the assembly is indeterminate and can be of any length from about one foot long, as shown in FIG. 6 having a very short length, to a very long length as shown in FIG. 8. The kit 200 includes a replacement post assembly 220 that may be up to 20 feet long, or as long as can be safely transported by a standard pick-up truck. As set forth in the use and installation discussion above, the installer measures the length of the gap in the upright post, and can cut to the almost exact required length of the replacement post member that is needed to complete replacing the post within the gap. Because of the modular aspect of the invention, replacement parts of the replacement post assembly may be taken from either end, or even from sections cut out from the middle of the assembly 220. Once the required length of replacement assembly 120, 220 is cut to length, of course, the other elements of the kit 200 are added. For example, the apertures 226, 224 are drilled so as to align with the apertures 218 of the receptor pin, which themselves may be drilled on site or predrilled as part of the repair kit 200. Other modifications, especially in respect the drilling in the side or front walls may be necessary, and if an aperture is drilled in the front face 122 (FIG. 3), then a second aperture (not shown) may require drilling in the frontmost wall of the reinforcement channel 130 to permit easy access for attachment of the nut to the bolts 166.

Other alternative configurations or customizations are possible, and will readily become apparent to those of skill in the art. For example, the connection apertures 118 are shown as being disposed on the front wall 117 of pin 116. However, these apertures may be disposed on the side walls of receptor pin 116, and corresponding apertures (not shown in FIG. 3) in the side walls of U-shaped replacement post 120 can be used to secure and connect the replacement post 120 to receptor pin 116.

The invention herein has been described and illustrated with reference to the embodiments of FIGS. 2-9, but it should be understood that the features and operation of the invention as described is susceptible to modification or alteration without departing significantly from the spirit of the invention as disclosed above. For example, the dimensions, size and shape of the various elements may be altered to fit specific needs. Accordingly, the specific embodiments illustrated and described herein are for illustrative purposes only and the invention is not limited except by the following claims.

What is claimed is:

1. A repair kit for a pallet rack frame, the pallet rack frame having a plurality of upright posts and a series of perpendicularly extending cross beams, connecting the plurality of upright posts and providing surfaces for receiving pallets, at least one of the upright posts having a damaged section being removed so as to provide a location for insertion of the replacement post of the repair kit, the repair kit comprising:

a) a replacement post assembly including a replacement post having an upper section, an intermediate section and a lower section, the replacement post being of a discrete length between about one foot and about twenty feet to match the length of the removed damaged section only, the replacement post having a front face and a back face; and a reinforcement channel member directly adjoining and being connected to the back face of the replacement post for the entire length of the replacement post;

b) a base configured to receive the lower section of the replacement post, the base comprising a footplate, the footplate including at least one anchor to fix the position of the footplate relative to a floor on which the footplate is to be received, and a post receiving member extending upwardly from the footplate, the post receiving member being configured to engage with the lower section of the replacement post and connect thereto by at least one connecting member; and c) a first connecting clamp member configured for joining and rigidly connecting the upper section of the replacement post to the undamaged upright adjacent a contact point, the replacement post being sized to provide a replacement only to the removed damaged section of the upright, the replacement post extending vertically from the undamaged upright post end to the base, and wherein base and the post receiving member are fixed to the floor, the at least one connecting member being shaped, configured and oriented to connect the lower section of the replacement post to the post receiving member, and the first connecting clamp member being shaped, configured and oriented to connect the upper section of the replacement post to the undamaged upright post end.

2. The repair kit according to claim 1 wherein the replacement post further comprises a metal square tubular material.

3. The repair kit according to claim 1 wherein the replacement post further comprises a U-shaped tubular material.

4. The repair kit according to claim 1 wherein the at least one first connecting clamp member further comprises at least one bolt.

5. The repair kit according to claim 1 wherein the at least one connecting member further comprises a second connecting clamp member configured for joining and rigidly connecting the lower section of the replacement post to the base.

6. A repair kit for a pallet rack frame, the pallet rack frame having a plurality of upright posts and a series of perpendicularly extending cross beams, connecting the plurality of upright posts and providing surfaces for receiving pallets, at least one of the upright posts having a damaged section being removed so as to provide a location for insertion of the replacement post of the repair kit, the repair kit comprising:

a) a measuring device for measuring the length of a damaged section of an upright post and for measuring the length of a replacement post for repairing the damaged section;

b) a variable length replacement post assembly, including a replacement post having an upper section, an intermediate section and a lower section, the replacement post being of a discrete length between about one foot and about twenty feet to match the length of a removed damaged section, the replacement post having a front face and a back face; and having a reinforcement channel member directly adjoining and being connected to the back face of the replacement post for the entire length of the replacement post;

c) a base configured to receive the lower section of the replacement post, the base comprising a footplate, the footplate including at least one anchor to fix the position of the footplate relative to a floor on which the footplate is intended to rest and a post receiving member extending from the footplate, the post receiving member being shaped, configured and oriented to engage with the lower section of the replacement post and connect thereto by at least one connecting member; and d) a first connecting clamp member configured for joining and rigidly connecting the upper section of the replacement post to the undamaged portion of the upright post, wherein the replacement post having been measured, using the measuring device, and being sized to provide a replacement to the removed damaged section of the upright post, the replacement post extending vertically from the undamaged upright post end to the base for a length matching the discrete length, and wherein base and the post receiving member are fixed to the floor by the at least one anchor, the at least one connecting member being shaped, configured and oriented to connect the lower section of the replacement post to the post receiving member, and the first connecting clamp member being shaped, configured and oriented to connect the upper section of the replacement post to the undamaged upright post end.

7. The repair kit according to claim 6 wherein the replacement post further comprises a metal square tubular material.

8. The repair kit according to claim 6 wherein the replacement post further comprises a U-shaped tubular material.

9. The repair kit according to claim 6 wherein the at least one first connecting clamp member further comprises at least one bolt.

10. The repair kit according to claim 6 wherein in addition to the at least one connecting member, the repair kit further comprises a second connecting clamp member shaped, configured and oriented for joining and rigidly connecting the lower section of the replacement post to the base.

11. A repair kit for a pallet rack frame, the pallet rack frame having a plurality of upright posts and a series of perpendicularly extending cross beams connecting the plurality of upright posts and providing surfaces for receiving pallets, the repair kit being provided for repair of an upright post having a damaged section, the damaged section only being removed so as to provide a location for insertion of the replacement post of the repair kit, the replacement post being only so long as the damaged upright post, the repair kit comprising:

a) a replacement post assembly including a replacement post having an upper section, an intermediate section and a lower section, the replacement post being of a discrete length between about one foot and about twenty feet to match the length of the removed damaged section, the replacement post having a front face and a back face; and a reinforcement channel member directly adjoining and being connected to the back face of the replacement post for the entire length of the replacement post;

b) a base configured to receive the lower section of the replacement post, the base comprising a footplate, the footplate including at least one anchor to fix the position of the footplate relative to a floor on which the footplate is to be received, and a post receiving member extending upwardly from the footplate, the post receiving member being configured to engage with the lower section of the replacement post and connect thereto by at least one connecting member; and c) a first connecting clamp member configured for joining and rigidly connecting the upper section of the replacement post to the undamaged upright, the replacement post being sized to provide a replacement only to the removed damaged section of the upright post, the replacement post extending vertically from the undamaged upright post end to the base for a length matching the discrete length, and wherein base and the post receiving member are fixed to the floor, the at least one connecting member being shaped, configured and oriented to connect the lower section of the replacement post to the post receiving member, and the first connecting clamp member being shaped, configured and oriented to connect the upper section of the replacement post to the undamaged upright post end.

12. The repair kit according to claim 11 wherein the at least one first connecting clamp member further comprises at last least one bolt.

\* \* \* \* \*